Feb. 5, 1929.
E. A. KERSTEIN
1,700,845
GAS METER INDICATOR MECHANISM
Filed July 29, 1925
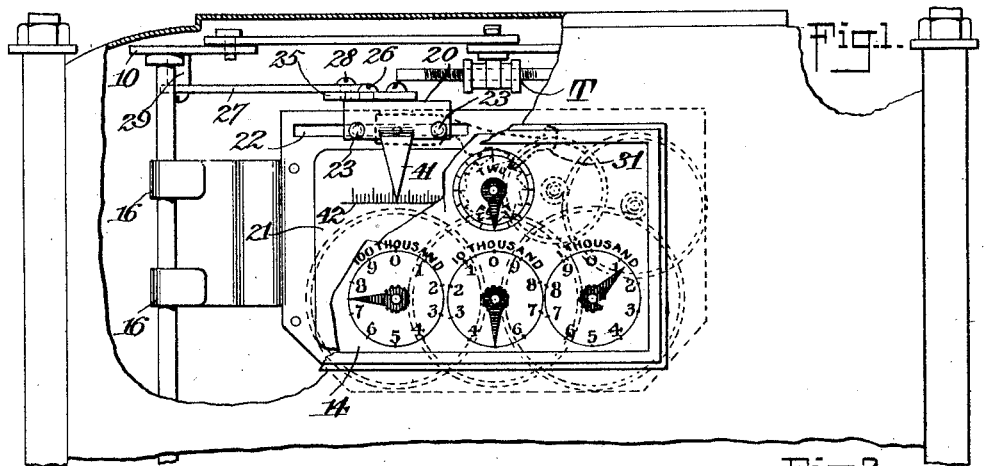
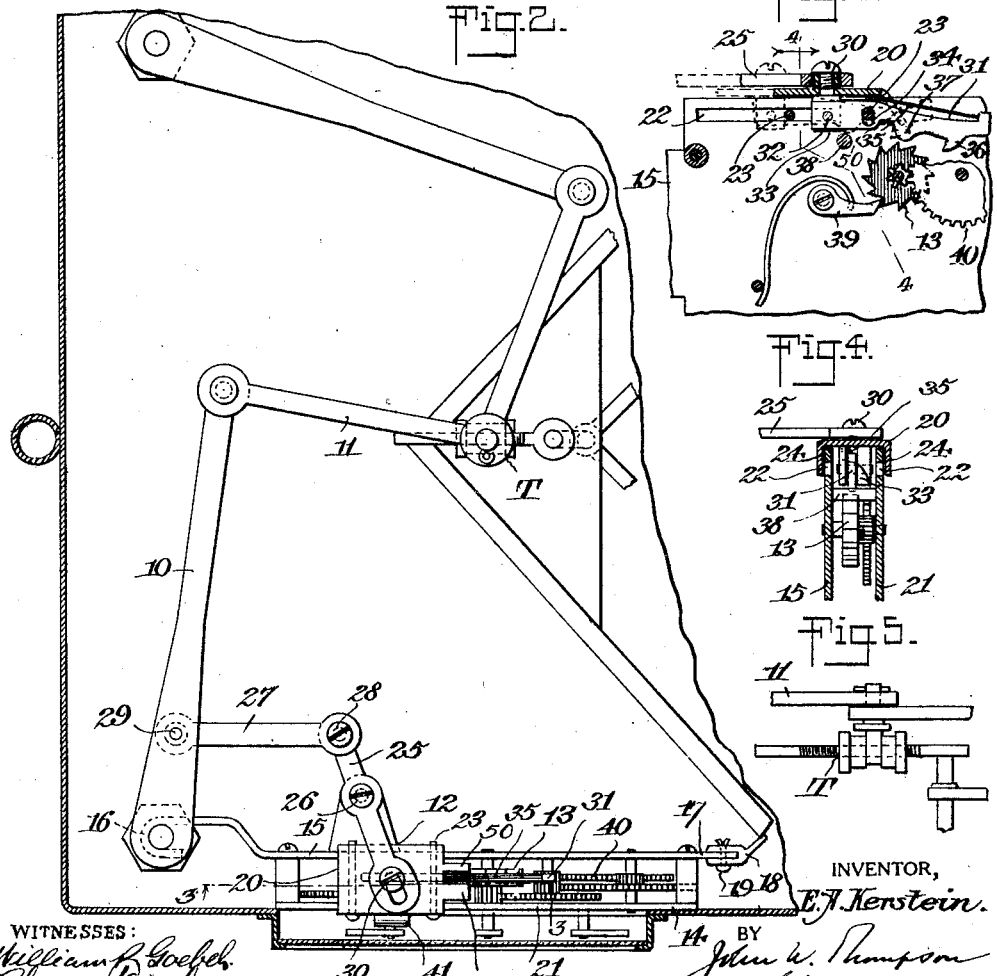
INVENTOR,
E. A. Kerstein.
BY
John W. Thompson
his ATTORNEY
WITNESSES:
William F. Goebel.
Chris Feinle.

Patented Feb. 5, 1929.

1,700,845

UNITED STATES PATENT OFFICE.

ERNEST ARTHUR KERSTEIN, OF BROOKLYN, NEW YORK, ASSIGNOR TO AMERICAN METER COMPANY, INCORPORATED, OF NEW YORK, N. Y., A CORPORATION OF DELAWARE.

GAS-METER-INDICATOR MECHANISM.

Application filed July 29, 1925. Serial No. 46,925.

This invention relates to gas meter indicating mechanisms and has especial reference to the mechanism employed in gas meters between the bellows operated means and the prime mover of the index.

The principal object of the present invention is to provide a more positive and direct motion transmission mechanism between the bellows operated means and the prime mover in the nature of a ratchet wheel of the index or register of a gas meter.

Another object of the invention is to provide in a gas meter a mechanism of the character mentioned which will be thoroughly efficient and effectual for the purpose intended and which will be more readily responsive to the action of the parts actuated by the bellows.

Another object of the invention is to provide a novel means for quickly indicating whether or not there is any gas passing through the meter.

With the foregoing and other objects in view, the invention resides in the particular provision, combination and operation of the parts hereinafter fully described and illustrated in the accompanying drawing, in which—

Figure 1 is a fragmentary front elevation of a gas meter showing the index thereof, and parts of the meter casing being broken away to show the manner in which the motion transmission mechanism of the present invention is employed.

Fig. 2 is a sectional plan view showing the relative disposition of the parts employed in the practice of the present invention.

Fig. 3 is a sectional view on an enlarged scale taken on the line 3—3 of Fig. 2.

Fig. 4 is a transverse sectional view taken substantially on the line 4—4 of Fig. 3, looking in the direction indicated by the arrow.

Fig. 5 is a detail view of the tangent.

In attaining the objects of the present invention it is necessary to employ the mechanism of the present invention in conjunction with well known parts of a gas meter. It is well known that the pointers of the index or register of a gas meter are operated through and by virtue of suitable mechanism which is responsive to the action of a pair of bellows of the gas meter. The operation of the bellows of a gas meter in response to the action of the gas passing therethrough causes the operation of parts known as flag wires. Each of the flag wires is turned alternately in opposite directions, one flag wire turning in one direction while the other is turning in an opposite direction to impart movement to a plurality of arms known as flag arms of which there are two pairs, and each pair of arms consists of a long flag arm such as the one shown at 10, and a short flag arm such as the one shown at 11. The said flag arms are connected to what is known as a tangent T for imparting rotary movement to a crank which is employed for operating the valves of the gas meter. It is the usual practice to transmit motion to the prime mover of the index from the crank mentioned, but this practice has been found to be faulty in that it requires relatively expensive parts and which are not freely responsive to the crank motion. In the present instance there is provided a mechanism 12 which is employed between one of the long flag arms 10 and a prime mover in the nature of a ratchet wheel 13 of the index or register 14 of the meter. The index or register 14 may be of any preferred type. In the present instance the rear plate 15 of the index is provided with hooks 16 which engage the flag wire to which the arm 10 is connected, and said plate is also provided with an extension 17 receivable in a member 18 attached to or otherwise carried by the valve box. Fastening elements such as split pins 19 are employed for holding the extension 17 in place between the spaced portions of the member 18. Under such an arrangement the index 14 is removably held in place.

The mechanism 12 in the present instance includes a mount or index carrier 20 which is arranged for reciprocatory movement. This is accomplished by providing the rear plate 15 and the front plate 21 of the index 14 with slots 22. Pins 23 attached to the depending portions 24 of the mount 20 are extended in said slots 22, thus permitting the mount 20 to have a reciprocatory movement within certain limits. The mount 20 is connected to the arm 10 by virtue of the employment of a lever 25 pivotally mounted as at 26 and an arm 27 pivotally connected as at 28 to one end of the lever 25 and pivotally connected as at 29 to the arm 10. One end of the lever 25 has pin and slot connection to the mount 20 as at 30. A pawl 31 positioned between guides 50 depending from carrier 20 is employed for coaction with the ratchet wheel 13. The pawl 31 is pivotally connected as at 32 to a lug 33. The pawl is also provided with a slot 34 into which is disposed one of the pins 23 to limit the pivotal movement of the pawl in opposite directions. The pawl is under the influence of a spring 35 connected to the lug 33 at one end with the opposite end bearing against said pawl to hold a tooth 36 thereof in a position to engage one of the teeth of the ratchet wheel 13 when the mount 20 is moved to the left. The pawl 31 is provided with a cam member 37 which rides on a roller 38 connected between the plates 15 and 21 to raise the pawl and therefore disengage the tooth 36 from the particular tooth of the ratchet wheel 13; the pawl being held elevated until the mount is moved for the engagement of another tooth of the ratchet wheel. The ratchet wheel 13 is prevented from turning in a clockwise direction by a spring actuated dog 39.

From the foregoing it will be understood that when gas is passing through the meter the bellows will operate and as a result the flag arms will be operated in response thereto. The long flag arm 10 will move after the manner of a pendulum. This movement of the arm 10 will cause the arm 27 to reciprocate and the lever 25 to move simultaneously to the flag arm 10 with the result that the mount 20 will be reciprocated. The reciprocation of the mount will cause the pawl 31 to act to move the ratchet wheel 13 step-by-step in a counter clockwise direction. This operation of the ratchet wheel 13 will transfer movement to the sets of toothed wheels indicated generally by the reference numeral 40. The sets of toothed wheels impart movement to the usual pointers.

In order that it may be indicated whether or not there is any gas passing through the meter, there is provided in the present instance a pointer 41 attached to or otherwise connected to one of the portions 24 of the mount 20. The said pointer 41 moves relative to a line of graduations 42 inscribed on the plate 21.

The mechanism 12 operates in response to the movement of the flag arm 10 regardless of the extent of its movement in opposite directions to move the ratchet wheel 13 one step at a time. Owing to variation in the capacity of the bellows to which the flag arm 10 is connected it is necessary to make an adjustment to compensate for the variance. The adjustment is usually made in the tangent T. The adjustment will not affect the operation of the mechanism 12 because the mount 20 is permitted to have a maximum reciprocatory movement to permit of a maximum movement of the flag arm 10.

I claim:

1. In a gas meter the combination of a flag arm, registering mechanism including a ratchet rotatable in one direction only, an indicator and pawl carrier mounted for reciprocatory motion, an indicator secured to said carrier, a pawl pivotally mounted in said carrier in position to periodically engage and actuate said ratchet, detent means for limiting the extent of movement of said pawl in both directions, and a link and lever connection between said flag arm and said indicator and pawl carrier to impart to the latter a reciprocatory sliding movement of exaggerated extent as compared to the motion required to effect unitary operation of said ratchet.

2. In a gas meter, the combination of forward and rear plates having opposed slots, registering mechanism operatively mounted between said plates, a reciprocatable indicator and pawl carrier having depending flanges overlying a portion of said plates and pawl guiding means positioned between the plates, a pin connection passing through said opposed slots and said plates, an indicator secured to said carrier, a ratchet mounted between said plates and rotatable in one direction only, a pawl pivotally mounted on said carrier between the flanges thereof and in operative relation to said pawl guiding means, a flag arm, and means operatively connecting said flag arm to said carrier to translate oscillatory motion of said flag arm into reciprocatory motion of said carrier.

3. In a gas meter, the combination of a casing having an opening through which to inspect the position of registering devices, a flag wire within said casing at one side of said opening, a registering device comprising a forward plate, a rear plate and a registering mechanism operatively positioned between said plates, said rear plate having a lateral extension with terminal portions thereof bent back upon themselves to form hooks which engage said flag wire, a bracket within the casing at the other side of said opening, and means for detachably securing a portion of said rear plate to said bracket.

In testimony whereof, I have signed my name to this specification this 27th day of July, 1925.

ERNEST ARTHUR KERSTEIN.